United States Patent Office 3,249,573
Patented May 3, 1966

3,249,573
EMPLOYMENT OF SULFOXIDES AS NOVEL PEPTIZING AGENTS
Kent W. Rollmann, Bartlesville, Okla., assignor to Phillips Petroleum Company, a corporation of Delaware
No Drawing. Filed Sept. 24, 1962, Ser. No. 225,897
13 Claims. (Cl. 260—30.8)

This invention relates to an improvement in the masticating of rubber. In another aspect, it relates to an improve process for masticating rubber, such as natural rubber and rubbery polymers of 1,3-butadiene, through the use of a novel class of peptizing agents. In another aspect, it relates to improved processable rubber compositions, an to the vulcanized compositions thereof.

In the manufacturing operations for producing vulcanized rubber articles, it is the usual practice to subject the unvulcanized rubber to mastication, mechanical working, or milling in the presence of air or oxygen to change the rubber to a more soft, pliable condition prior to molding or shaping the rubber an vulcanizing the same. This mastication, for example on a roll mill, internal mixer, or screw plasticator, breaks the tenacity of the rubber and the degree to which it is broken down is influenced by the time, temperature and the vigor of the mechanical working. With some types of rubber the desired changes can be achieved only under prolonged treatment which is frequently accompanied by detrimental changes in the properties of the vulcanizates. In order to reduce the time and power required to improve the processibility of the rubber and prevent deterioration of the rubber resulting from extended milling operations, it is a common practice to incorporate into the rubber a peptizing or chemical plasticizing agent which accelerates the effect of the mechanical working of the rubber and facilitates incorporation of compounding ingredients such as carbon black and other reinforcing agents, accelerators, vulcanizing agents, etc. Many of the peptizing agents used heretofore have given some improvement in the processability of the rubber, but many of these agents must be used in fairly large amounts to bring about satisfactory acceleration in the processing of the rubber, some give rise to disagreeable odor or odor development in the rubber, while others are toxic while in contact with the skin or inhaled.

Accordingly, an object of this invention is to improve the processing, mechanical working, or mastication, of unvulcanized rubber, such as natural rubber, and synthetic rubbery polymers of conjugated dienes, particularly 1,3-butadiene, by incorporating into the rubber to be masticated one or more members of a novel class of peptizing agents. Another is to provide improved processable rubbers which can be masticated or mechanically worked in a relatively short time and with low power requirements. A further object is to provide improved vulcanized rubber compositions prepared by vulvanizing such improved rubber compositions. Further objects and advantages of this invention become apparent to those skilled in the art from the following discussion and appended claims.

I have discovered that the mastication or mechanical working of unvulcanized rubbers can be improved by incorporating into such rubbers one or more of a novel class of peptizing agents, namely the class comprising sulfoxides and sulfones.

The novel class of the new peptizing agents of this invention can be represented by the general formula

where R and R' are radicals selected from the group consisting of alkyl, cycloalkyl, aryl, and combinations thereof such as alkylcycloalkyl, alkaryl, aralkyl, arylcycloalkyl, alkylaralkyl, etc., and where R and R' can be alkylene radicals connected together to form a heterocyclic ring with S, and $n$ is an integer of 1 (in which case the agent is a sulfoxide) or 2 (in which case the agent is a sulfone). R and R' can contain groups that are non-reactive under the conditions employed, such as alkoxy, cycloalkoxy, aryloxy, hydroxy, carboxy, cyano, halo, nitro and amino, though I prefer to employ as R and R' unsubstituted hydrocarbon radicals. The number of carbon atoms in such compounds can vary, but generally will not be greater than 30.

Representative sulfoxides and sulfones useful in the practice of this invention and within the scope of the above general formula are: dimethyl sulfoxide, dimethyl sulfone, methyl ethyl sulfoxide, methyl ethyl sulfone, diethyl sulfoxide, methyl n-propyl sulfoxide, di-n-propyl sulfoxide, di-isopropyl sulfoxide, di-tert-butyl sulfone, di-n-butyl sulfoxide, n-propyl isobutyl sulfone, isopropyl n-butyl sulfoxide, diisobutyl sulfoxide, tert-butyl n-nonyl sulfone, diisoamyl sulfoxide, diisoamyl sulfone, di-n-octyl sulfoxide, di-n-octyl sulfone, n-decyl n-dodecyl sulfoxide, di-n-tridecyl sulfone, di-n-pentadecyl sulfone, n-tetradecyl n-hexadecyl sulfoxide, n-tridecyl n-hexadecyl sulfone, n-decyl n-eicosyl sulfoxide, ethyl n-decyl sulfone, ethyl phenyl sulfoxide, methyl phenyl sulfone, diphenyl sulfoxide, diphenyl sulfone, di-1-naphthyl sulfoxide, phenyl 1-naphthyl sulfoxide, phenyl 2-naphthyl sulfone, phenyl benzyl sulfoxide, n-octyl phenyl sulfoxide, n-amyl phenyl sulfone, phenyl p-tolyl sulfoxide, isoamyl p-tolyl sulfoxide, n-octyl p-tolyl sulfone, di-benzyl sulfoxide, di-p-tolyl sulfoxide, benzyl p-tolyl sulfone, 2-ethylphenyl 2-phenylethyl sulfoxide, 4-methylphenyl 3-(2 ethylphenyl)propyl sulfoxide, 4-ethylphenyl 2-(4 ethylphenyl)ethyl sulfone, dicyclopentyl sulfoxide, dicyclohexyl sulfone, dicyclohexyl sulfoxide, cyclopentyl cyclohexyl sulfoxide, 4-methylcyclohexyl 2-(4-ehtylphenyl)ethyl sulfoxide, bis(3-iodocyclohexyl)sulfone, bis(2-fluorophenyl) sulfoxide, cycloheptyl 3-methylcyclohexyl sulfone, n-nonyl cyclohexyl sulfoxide, n-octyl cyclohexyl sulfone, cyclohexyl phenyl sulfoxide, cyclohexyl phenyl sulfone, cyclohexyl benzyl sulfoxide, cyclohexyl benzyl sulfone, cyclopentyl p-tolyl sulfoxide, trimethylene sulfoxide, tetramethylene sulfoxide, trimethylene sulfone, tetramethylene sulfone, α-methyltetramethylene sulfone, bis(methoxymethyl) sulfoxide, methoxymethyl 2-ethoxyethyl sulfone, 2-ethoxypropyl n-octyl sulfoxide, 2-isobutoxyethyl n-octyl sulfoxide, phenoxymethyl benzyl sulfoxide, phenoxymethyl p-tolyl sulfone, 5-cyclohexoxyamyl phenyl sulfoxide, di-3-phenoxypropyl sulfone, 4-benzyloxybutyl p-tolyloxymethyl sulfone, bis(2-cyanoethyl sulfoxide, 2-ethoxyethyl 5-cyanoamyl sulfone, 4-cyanophenyl n-octyl sulfoxide, 4-cyanophenyl phenoxymethyl sulfone, 4-cyanocyclohexyl phenyl sulfoxide, bis(3-cyanocyclopentyl) sulfone, bis(chloromethyl) sulfoxide, bis(3-chloropropyl) sulfoxide, 3-chloropropyl n-octyl sulfone, 4-bromobutyl phenyl sulfoxide, 4-chlorocyclohexyl 2-phenoxyethyl sulfone, 2,2-dichloroethyl 3,4,5-tribromoamyl sulfoxide, 4-cyanophenyl 5-bromo-n-decyl sulfone, bis(3-chloropropyl) sulfone, 5-cyano-6-ethoxy-8-chloroctyl n-octyl sulfone, hydroxymethyl methyl sulfoxide, hydroxymethyl n-octyl sulfone, 3,5-dihydroxyphenyl ethyl sulfoxide, 2,3-dihydroxyphenyl phenoxymethyl sulfone, 4-hydroxycyclohexyl 4-hydroxybenzyl sulfoxide, 3,5-dihydroxyphenyl ethyl sulfone, 2-hydroxyethyl 4-cyanophenyl sulfoxide, 3-hydroxypropyl 4-cyanophenyl sulfone, 3-chloropropyl 5-hydroxyamyl sulfoxide, 4-bromophenyl 3-hydroxy-p-tolyl sulfone, 3-nitropropyl ethyl sulfoxide, 2-hydroxyethyl 2-nitroethyl sulfone, 4-nitrophenyl phenyl sulfoxide, 3-chloropropyl 4-nitrocyclohexyl sulfoxide, bis(4-nitrophenyl) sulfone, 4-carboxyphenyl n-octyl sulfone, 2,2-dichloroethyl 3-carboxypropyl sufone, 2-aminoethyl 3-chloropropyl sulfoxide, 4-aminophenyl n-hexyl sulfone, and the like.

The peptizing agents of this invention can be employed in relatively low amounts and do not create an odor problem in handling or use. The peptizing agent is incorporated into the rubber and the mixture milled or masticated in a conventional rubber masticator or mixer in the presence of air or oxygen, the mixing time being dependent to some extent on the vigor of the mixing action. Mastication of the rubber in the presence of the peptizing agents of this invention can take place prior to compounding with conventional compounding ingredients, or can take place in the presence of such compounding ingredients. It is also within the scope of this invention to carry out the mastication in the presence of the peptizing agents of this invention together with so-called "physical plasticizers," such as aromatic oils.

Generally, the amount of the peptizing agent used in this invention will be in the range of 0.01 to 2 parts by weight per 100 parts rubber, preferably in the range of 0.05 to 1.5 parts per 100 parts rubber. Generally, the mastication will be carried out in the range of 3 to 10 minutes. The temperature of the mastication can vary but generally will be above 100° C. and preferably at least 110° C., the peptizing action being relatively slow at lower temperatures. Temperatures up to 250° C. can be used.

It is also within the scope of this invention to employ along with the novel peptizing agents of this invention other conventional peptizing agents.

I have found that the peptizing action of the novel peptizing agents of this invention can be improved to a certain extent by also incorporating organic peroxides. Such peroxides aid in the break down of the rubber and improve the general milling operation. When such peroxides are used in conjunction with the sulfoxide or sulfone peptizing agents of this invention, the amount of the organic peroxide used will generally be in the range sufficient to provide from 0.002 to 0.025, preferably from 0.005 to 0.02, part by weight of peroxy oxygen (—O—O—) per 100 parts rubber, with the amount of sulfoxide or sulfone preferably exceeding that of the peroxy oxygen, i.e., the weight ratio of the sulfinyl or sulfonyl radical to peroxy oxygen generally being at least 1.5:1.

The organic peroxides which can be used in conjunction with the sulfoxides or sulfones of this invention are well known and can be represented by the general formulas R—O—O—R or R—O—O—H (the latter generally being known as hydroperoxides but included in the term "organic peroxides" as used herein, unless otherwise noted) where R is selected from the group consisting of an acyl radical, a saturated acyclic radical, an olefinically unsaturated acyclic radical, a saturated cyclic radical, an olefinically unsaturated acyclic radical, and an aromatic radical, and wherein said R radical can be substituted with a member selected from the group consisting of a halogen, a hydroxy radical and an R'O— radical, wherein R' is selected from the group consisting of an acyl radical, a saturated acyclic radical, an olefinically unsaturated acyclic radical, a saturated cyclic radical, an olefinically unsaturated cyclic radical, and an aromatic radical. It is to be understood that mixed compounds can be used, e.g., organic peroxides in which one of the oxygens of the peroxy group is joined to a hydrocarbon group, such as alkyl or cycloalkyl, while the other oxygen is joined to an acyl group. Peroxy compounds which are half-esters or diesters of dicarboxylic acids are also applicable as well as monoperoxy compounds derived from the dicarboxylic acids. Examples of suitable peroxides include the following: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis(4 - methyl-2-hexenyl) peroxide, bis(4-octenyl) peroxide, diacetyl peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis(alpha-ethylbenzyl) peroxide, bis[diisopropyl-(4-isopropylphenyl)methyl] peroxide, bis[dimethyl - (4-tert-butylphenyl)methyl] peroxide, benzyl alpha-methylbenzyl peroxide, bis[(4 - chlorobenzoyl)] peroxide, bis(2,4 - dichlorobenzoyl) peroxide, bis(2-propoxy-n-hexyl) peroxide, n-pentyl 5,8-diphenyldodecyl peroxide, bis(9,10 - dihydroxydecyl) peroxide, 2,5-bis(tert-butylperoxy) - 2,5-dimethylhexane, bis(2-hydroxyheptyl) peroxide, tert-butyl hydroperoxide, dodecyl hydroperoxide, eicosyl hydroperoxide, triacontanyl hydroperoxide, 4-methylcyclohexyl hydroperoxide, phenylcyclohexane hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide [dimethyl - (4-isopropylphenyl)hydroperoxymethane], (4-ethoxyphenyl)methyl hydroperoxide, di-n-henyl-4 - hydroxyphenyl-hydroperoxymethane, dimethyl (3 - methoxyphenyl)hydroperoxymethane, peroxybenzoic acid, peroxybutyric acid, peroxydodecanoic acid, tert-butyl peroxybenzoate, di-tert-amyl diperoxyphthalate, tert-dodecyl peroxyacetate, the OO-tert-butyl half ester of peroxymaleic acid

[HOOC—CH=CH—CO—O$_2$—C(CH$_3$)$_3$]

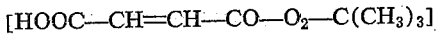

and the OO-n-amyl half ester of peroxyphthalic acid. Peroxides formed by the oxidation of terpene hydrocarbons such as pinane, alphapinene, p-methane, and turpentine can also be used. The peroxides which are preferred in this invention are those which decompose at a comparatively low temperature, e.g., at a temperature in the range of 250 to 350° F., and the preferred peroxide is cumene hydroperoxide.

The sulfoxide and sulfone peptizing agents of this invention are of particular value in improving the mastication, mechanical working or processing of rubbers which are difficult to break down under conventional masticating operations. In particular, they can be used to improve the processability of synthetic rubbers of 1,3- butadiene.

The rubbers which can be treated by our invention include natural rubber and synthetic rubber polymers of conjugated dienes. Such conjugated dienes normally contain from 4 to 12 carbon atoms per molecule and those containing from 4 to 8 carbon atoms are preferred. Examples of such conjugated dienes include 1,3-butadiene, isoprene, piperylene, 1,3-octadiene, 4,5-diethyl, 1,3-octadiene and the like. The polymers of conjugated dienes include not only the homopolymers of these dienes and copolymers of the dienes with each other but also copolymers of conjugated dienes in major amount with other copolymerizable monomers such as styrene, 1-vinylnaphthalene, 2-methyl-5-vinylpyridine, methyl methacrylate, acrylonitrile, and the like. My invention is particularly valuable and I prefer to practice it with polybutadienes having relatively high cis configuration, and the term "cis-polybutadiene" is used herein and in the appended claims to mean a polybutadiene polymer in at which at least 75 percent, preferably at least 85 percent, of the polymer is formed by 1,4-addition of 1,3-butadiene and has the cis-configuration. Polybutadienes of this type are frequently produced having inherent viscosities between 2.3 and 3.0 and it is highly desirable that such polymers be treated in order to reduce their inherent viscosity to a value in the range of about 1.7 to 2.3 for the sake of improved processability.

Inherent viscosity is determined by placing 0.1 gram of polymer in a wire cage in 100 milliliters of toluene and allowing the polymer to stand at room temperature (about 25° C.) for 24 hours. The cage is then removed and the solution filtered through a sulfur absorption tube of grade C porosity to remove solid particles. The solution is then passed through a Medalia-type viscometer at 25° C., the viscometer having been calibrated with toluene. The inherent viscosity is calculated by dividing the natural logarithm of the relative viscosity by the weight of the original sample. The relative viscosity is the ratio of the viscosity of the polymer solution to that of toluene.

The microstructures of the polymers are determined by dissolving a sample of the polymer in carbon disulfide to form a solution of 25 grams of polymer per liter of solution. Using a commercial infrared spectrometer the infrared spectrum of the solution (percent transmission) is then determined.

The percent of the total unsaturation present as trans 1,4- is calculated according to the following equation and consistent units: $\epsilon = E/tc$, where $\epsilon$ is extinction coefficient (liters-mols$^{-1}$-centimeters$^{-1}$); E is extinction (log $I_o/I$); $t$ is path length (centimeters); and $c$ is concentration (mols double bond/liter). The extinction is determined at the 10.35 micron band and the extinction coefficient is 146 (liters-mols$^{-1}$-centimeters$^{-1}$).

The percent of the total unsaturation present as 1,2- (or vinyl) is calculated according to the above equation, using 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above procedure from the theoretical unsaturation, assuming one double bond per each $C_4$ unit in the polymer.

The rubber composition of this invention can have incorporated therein the various compounding materials, including reinforcing pigments such as carbon black, zinc oxide, magnesium carbonate, etc., and other fillers, sulfur, accelerators, and the novel peptizing or chemical plasticizing agents of this invention. Stocks from such compositions will be useful for footwear, extruded articles, tire carcasses, tire treads, and other mechanical goods.

The objects and advantages of this invention are further illustrated in the following examples, but it should be understood that the materials, conditions, and proportions used in these examples are only typical and should not be construed to limit this invention unduly.

*Example I*

A series of runs was made in which the effect of different sulfoxides, alone or in conjunction with cumene hydroperoxide, on the breakdown in air of cis-polybutadiene containing carbon black was determined by mastication of the elastomer composition in a Brabender Plastograph. The cis-polybutadiene employed was prepared by the polymerization of butadiene in the presence of a catalyst system comprising triisobutylaluminum, titanium tetrachloride, and iodine. It was a gel free polymer that had a Mooney value (ML-4 at 212° F.) of 42, an inherent viscosity of 2.52, a cis content of 95.5 percent, a trans content of 1.4 percent, and a vinyl content of 3.1 percent.

Carbon black and other additives, including peptizer ingredients, were milled into the polymer on a cool two-inch mill before charging into the Plastograph. The recipe was as follows:

TABLE I

| | Parts by weight |
|---|---|
| cis-Polybutadiene | 100 |
| High abrasion furnace black (Philblack O) | 60 |
| Aromatic oil (Philrich 5) | 10 |
| Lauric acid | 2 |
| Peptizer | variable |

The jacket temperature of the Plastograph was regulated at 65° C. and the torque recorders set and zeroed. The polymer composition was cut into ribbons and fed into the mixing head as rapidly as possible with the mixer set at approximately 25 r.p.m. This operation required less than a minute. The charge weight to the plastograph was 57 grams. The mixing was then started by starting the motor and setting the speed at 150 r.p.m. The torque (meter-kilograms) required to turn the rotors was noted. Total mixing time for each sample was 6 minutes. A control run was made without any peptizer. Quantities of peptizer materials and final torque (a measure of breakdown) after 6 minutes are shown in Table II.

TABLE II

| R—S(O)$_n$—R' Peptizer [1] | | Cumene hydroperoxide,[2] phr. | Final torque, m.-kg. |
|---|---|---|---|
| Type | Amt., phr. | | |
| None (control) | 0 | 0 | 2.36 |
| Di-n-butyl | 1 | 0 | 2.00 |
| Do | 1 | 0.15 | 2.02 |
| Di-isobutyl | 1 | 0 | 2.25 |
| Do | 1 | 0.15 | 2.09 |
| Do | 0.75 | 0 | 2.28 |
| Do | 0.75 | 0.15 | 2.10 |
| Do | 0.75 | 0.05 | 2.10 |
| Do | 0.5 | 0 | 2.28 |
| Do | 0.5 | 0.15 | 2.10 |
| Do | 0.5 | 0.05 | 2.15 |
| Tetramethylene | 1 | 0 | 2.26 |
| Do | 1 | 0.15 | 2.06 |
| Di-isopropyl | 1 | 0 | 2.23 |
| Do | 1 | 0.15 | 2.14 |
| Di-isoamyl | 1 | 0 | 2.18 |
| Do | 1 | 0.15 | 2.07 |
| Diphenyl | 1 | 0 | 2.09 |
| Do | 1 | 0.15 | 2.10 |
| Di-p-tolyl | 1 | 0 | 2.12 |
| Do | 1 | 0.15 | 2.10 |
| Dibenzyl | 1 | 0 | 2.09 |
| Do | 1 | 0.15 | 2.07 |
| Do | 0.75 | 0 | 2.10 |
| Do | 0.75 | 0.15 | 2.05 |
| Do | 0.75 | 0.05 | 2.12 |
| Do | 0.5 | 0 | 2.18 |
| Do | 0.5 | 0.15 | 2.09 |
| Do | 0.5 | 0.05 | 2.07 |

[1] Peptizers listed are sulfoxides, i.e., "n" in general formula is 1.
[2] The amount of peroxy oxygen is one-tenth that of the hydroperoxide.

The data of Table II show that the peptizing agents of this invention significantly improve the breakdown of the rubber (as indicated by the lower final torque), and that in many instances even greater breakdown resulted when these peptizing agents were used in conjunction with the hydroperoxide agent. The control without peptizing was crumbly and very difficult to mill, whereas the peptized rubbers had good milling properties.

*Example II*

Sixteen of the masticated stocks of Example I and an unmasticated sample of the same cis-polybutadiene were compounded using the following recipe:

TABLE III

| | Parts by weight | |
|---|---|---|
| | Peptized composition | Unmasticated polybutadiene |
| cis-Polybutadiene peptized composition | 172 | |
| cis-Polybutadiene | | 100 |
| High abrasion furnace black (Philblack O) | | 60 |
| Aromatic oil (Philrich 5) | | 10 |
| Lauric acid | | 2 |
| Zinc oxide | 3 | 3 |
| Stearic acid | 2 | 2 |
| Sulfur | 1.6 | 1.6 |
| Santocure [1] | 1 | 1 |

[1] N-cyclohexyl-2-benzothiazolesulfenamide.

The compounded stocks were mixed on a roll mill, cured 40 minutes at 307° F. and the physical properties determined as shown in Table IV. The property "$\nu \times 10^4$" is the number of effective network chains per unit volume of rubber, the higher the number the more the rubber is crosslinked (vulcanized), this property being determined by the swelling method of Kraus, as given in Rubber World 135, 67–73, 254–260 (1956). The properties termed "300% Modulus," "Tensile" and "Elongation," were determined on a Model TM Instron Tensile Machine, wherein the rubber specimens (0.020 x 0.125 inch) were pulled from a 2-inch gage length at a crosshead speed of 20 inches/min. at room temperature; the rubber specimens were marked with marks 1 inch apart and the 300% modulus was obtained by noting the strain of the sample when the marks were 4 inches apart (300% elongation). The property termed "Shore A" hardness was determined by ASTM D 676–55T on a Shore Durometer, Type A. The property termed "Resilience" was determined according to ASTM D–945–55 (modified), using a Yerzley oscillograph, with right circular cylinder specimens 0.7 inch in diameter and 1 inch high. The property termed "ΔT" (heat buildup) was determined according to ASTM D 623–52T, Method A, using a Goodrich Flexometer, 143 lbs./sq. in. load, 0.175 inch stroke, with right circular cylinder test specimens measuring 0.7 inch in diameter and 1 inch in height.

ner described in Example I to determine their effect on the breakdown in air of the polymer. The polymer and the quantities of carbon black, aromatic oil, and lauric acid were the same as in Example I. Quantities of peptizer materials and final torque (6 minutes) are shown in Table V.

*Table V*

| R—S(O)$_n$—R' Peptizer | | Cumene hydroperoxide, phr. | Final torque, m.-kg. |
|---|---|---|---|
| Type | Amt., phr. | | |
| Ethoxypropyl n-octylsulfoxide | 1 | 0 | 2.18 |
| Do | 1 | 0.1 | 2.05 |
| Isobutoxyethyl n-octylsulfoxide | 1 | 0 | 2.10 |
| Do | 1 | 0.1 | 2.05 |
| 2,2'-Dicyanodiethyl sulfoxide | 1 | 0 | 2.20 |
| Do | 1 | 0.1 | 2.18 |
| Di-tert-butylsulfone | 1 | 0 | 2.20 |
| Do | 1 | 0.1 | 2.18 |
| Trimethylenesulfone | 1 | 0 | 2.15 |
| Do | 1 | 0.1 | 2.14 |
| Di-n-octylsulfone | 1 | 0 | 2.13 |
| Do | 1 | 0.1 | 2.11 |
| 3,3'-Dichloropropylsulfone | 1 | 0 | 2.13 |
| Do | 1 | 0.1 | 2.11 |
| 3-Chloropropyl n-octylsulfone | 1 | 0 | 2.12 |
| Do | 1 | 0.1 | 2.11 |

TABLE IV

| R—S(O)$_n$—R' Peptizer | | Cumene hydroperoxide, phr. | $\nu \times 10^4$, moles/cc. | 300% Modulus, p.s.i. | Tensile, p.s.i. | Elongation, percent | Shore A hardness | ΔT, °F. | Resilience, percent |
|---|---|---|---|---|---|---|---|---|---|
| Type | Amt., phr. | | | | | | | | |
| None (control) | 0 | 0 | 1.94 | 1,300 | 1,800 | 400 | 67 | 63 | 70 |
| Di-n-butylsulfoxide | 1 | 0 | 2.17 | 1,700 | 2,840 | 450 | 65 | 54 | 72 |
| Do | 1 | 0.15 | 2.13 | 1,810 | 2,320 | 360 | 64 | 51 | 74 |
| Diisobutylsulfoxide | 1 | 0 | 2.16 | 1,800 | 2,810 | 430 | 65 | 49 | 74 |
| Do | 1 | 0.15 | 2.22 | 1,910 | 2,500 | 370 | 65 | 50 | 77 |
| Tetramethylenesulfoxide | 1 | 0 | 2.37 | 2,120 | 2,710 | 370 | 66 | 48 | 77 |
| Do | 1 | 0.15 | 2.40 | 2,140 | 2,860 | 370 | 66 | 48 | 76 |
| Diisoamylsulfoxide | 1 | 0 | 2.19 | 1,820 | 2,570 | 390 | 65 | 48 | 77 |
| Do | 1 | 0.15 | 2.09 | 1,730 | 2,790 | 430 | 60 | 47 | 76 |
| Diisopropylsulfoxide | 1 | 0 | 2.53 | 2,190 | 2,800 | 370 | | | |
| Do | 1 | 0.15 | 2.10 | 1,790 | 2,770 | 430 | 66 | 51 | 75 |
| Diphenylsulfoxide | 1 | 0 | 2.29 | 1,950 | 2,850 | 390 | 64 | 47 | 76 |
| Do | 1 | 0.15 | 2.05 | 1,780 | 2,890 | 430 | 67 | 47 | 79 |
| Dibenzylsulfoxide | 1 | 0 | 2.06 | 1,820 | 3,060 | 440 | 64 | 48 | 76 |
| Do | 1 | 0.15 | 2.10 | 1,820 | 2,820 | 420 | 64 | 48 | 77 |
| Di-p-tolylsulfoxide | 1 | 0 | 2.30 | 2,080 | 2,730 | 370 | 65 | 48 | 77 |
| Do | 1 | 0.15 | 2.12 | 1,920 | 2,640 | 380 | 65 | 46 | 77 |

The data of Table IV on the vulcanized stocks show that those prepared from the rubber compositions that were processed with the sulfoxide peptizing agents of this invention had, in general, improved properties, i.e., higher modulus, higher tensile, lower heat buildup, and higher resilience than the unmasticated stock that was vulcanized, and also that in many instances the joint use of hydroperoxide gave even slightly better results.

*Example III*

Several additional sulfoxides and sulfones, alone and in combination with cumene hydroperoxide, were added to a cis-polybutadiene-carbon black composition in the man- The data of Table V show that some better processability is attained when the sulfoxide is used in conjunction with the hydroperoxide.

*Example IV*

The effect of different carbon blacks on benzyl sulfoxide peptized cis-polybutadiene was studied. The polymer was the same as that used in the foregoing examples and the procedure described in Example I was followed. The runs are summarized in the following table.

*Table VI*

| Carbon black | | Benzyl sulfoxide, phr. | Cumene hydroperoxide, phr. | Initial torque, k.-mg. | Final torque, k.-mg. |
|---|---|---|---|---|---|
| Type | Amt., phr. | | | | |
| Furnace black, super abrasion [1] | 50 | 0 | 0 | 2.87 | 2.55 |
| Do | 50 | 0.6 | 0.05 | 2.89 | 2.18 |
| Furnace black, intermed. super abrasion [2] | 50 | 0 | 0 | 2.96 | 2.38 |
| Do | 50 | 0.8 | 0 | 3.01 | 2.23 |
| Do | 50 | 0.6 | 0.05 | 2.93 | 2.20 |
| Furnace black, high abrasion [3] | 50 | 0 | 0 | 2.86 | 2.23 |
| Do | 50 | 0.8 | 0 | 2.86 | 2.10 |
| Do | 50 | 0.6 | 0.05 | 2.96 | 2.05 |
| Channel black [4] | 50 | 0 | 0 | 2.62 | 2.30 |
| Do | 50 | 0.8 | 0 | 2.48 | 2.17 |
| Do | 50 | 0.6 | 0.05 | 2.45 | 2.10 |

[1] Philblack E.
[2] Philblack I.
[3] Philblack O.
[4] Wyex.

The data show that the peptizers of this invention are effective peptizers alone, in the presence of peroxides, and in the presence of carbon black.

Various modifications and alterations of this invention will become apparent to those skilled in the art from the foregoing discussion and examples, and it should be understood that this invention is not to be limited unduly to that set forth herein for illustrative purposes.

I claim:
1. In the process of masticating a rubbery polymer of 1,3-butadiene the improvement comprising incorporating into said rubbery polymer in an amount sufficient to enhance the breakdown of said rubbery polymer a sulfoxide peptizing agent selected from the class of sulfoxides having the formula:

where R and R' are radicals selected from the group consisting of alkyl, cycloalkyl, aryl, in which R and R' can be alkylene radicals connected together to form a heterocyclic ring with S of said formula, and the total number of carbon atoms in said formula does not exceed 30.

2. As a new composition of matter, a masticated vulcanized rubbery polymer of 1,3-butadiene, wherein said masticated rubbery polymer of 1,3-butadiene has incorporated therewith in an amount sufficient to enhance the breakdown of said rubbery polymer, a sulfoxide selected from the class of sulfoxides having the formula:

wherein R and R' are radicals selected from the group consisting of alkyl, cycloalkyl, aryl, in which R and R' can be alkylene radicals connected together to form a heterocyclic ring with S of said formula, and the total number of carbon atoms in said formula does not exceed 30.

3. The process according to claim 1, wherein said improvement further comprises incorporating into said rubbery polymer in an amount sufficient to enhance the peptizing action of said peptizing agent an organic peroxide.

4. The process according to claim 1, wherein said rubber polymer is cis-polybutadiene.

5. The process according to claim 4, wherein said peptizing agent is benzyl sulfoxide.

6. The process according to claim 3, wherein said rubbery polymer is cis-polybutadiene, said peptizing agent is benzyl sulfoxide, and said organic peroxide is cumene hydroperoxide.

7. The composition of claim 2, wherein said masticated rubbery polymer is cis-butadiene.

8. The composition of claim 7, wherein said compound is benzyl sulfoxide.

9. The composition of claim 7, wherein said compound is tetramethylene sulfoxide.

10. The composition of claim 7, wherein said compound is diisobutyl sulfoxide.

11. The composition of claim 7, wherein said compound is diphenyl sulfoxide.

12. The composition of claim 2, wherein said composition further comprises an organic peroxide.

13. The composition of claim 12, wherein said masticated rubber polymer is cis-polybutadiene, said compound is benzyl sulfoxide, and said organic peroxide is cumene hydroperoxide.

References Cited by the Examiner
UNITED STATES PATENTS

| | | | |
|---|---|---|---|
| 2,127,400 | 8/1938 | Gibbs | 260—30.8 |
| 2,344,843 | 3/1944 | Wellman. | |
| 2,419,082 | 4/1947 | Morris et al. | 260—30.8 |
| 2,522,776 | 9/1950 | Busse | 260—30.8 |
| 2,618,620 | 11/1952 | Davis et al. | 260—30.8 |
| 2,968,678 | 1/1961 | Oswald | 260—30.8 |
| 3,102,102 | 8/1963 | Weidner et al. | 260—761 |

ALEXANDER H. BRODMERKEL, *Primary Examiner.*

MORRIS LIEBMAN, *Examiner.*

A. O. DENT, B. A. AMERNICK, *Assistant Examiners.*